United States Patent Office 2,723,251
Patented Nov. 8, 1955

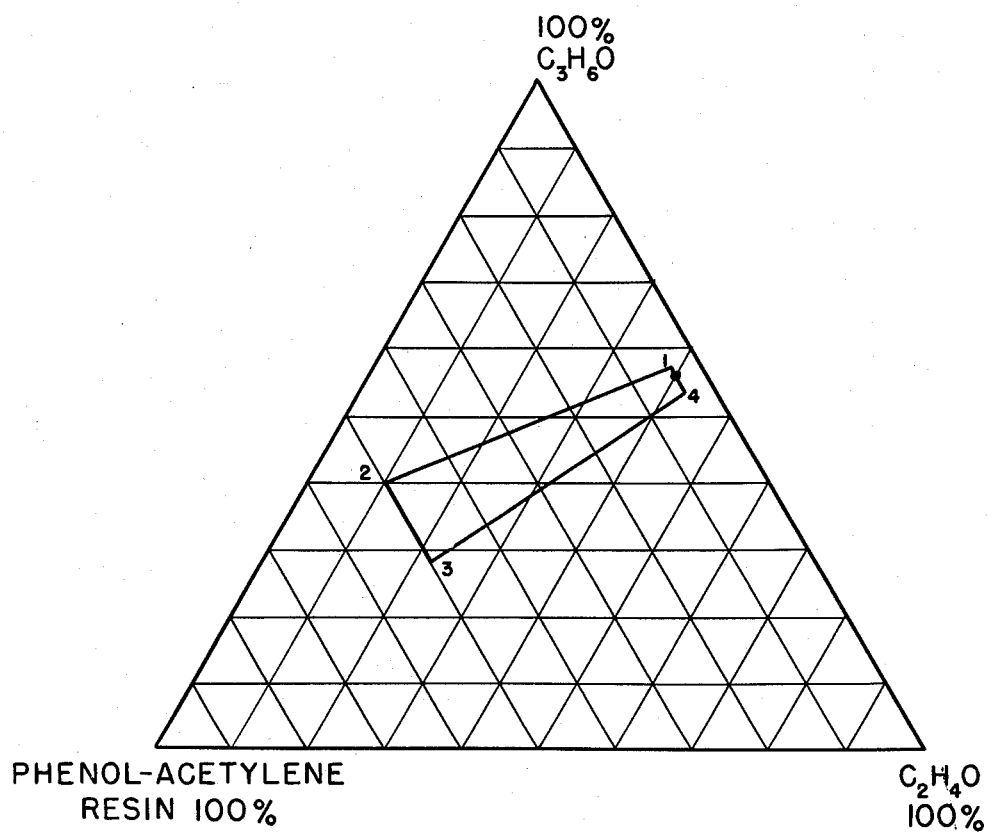

2,723,251

OXYALKYLATED DERIVATIVES OF FUSIBLE ACETYLENE-PHENOLIC RESINS

Melvin De Groote, St. Louis, and Bernhard Keiser, Webster Groves, Mo., assignors to Petrolite Corporation, Wilmington, Del., a corporation of Delaware Application May 5, 1953, Serial No. 353,042

5 Claims. (Cl. 260—62)

The present invention is concerned with certain new chemical products, compounds, or compositions which have useful application in various arts. This application is a continuation-in-part of our application Serial No. 129,710, filed November 28, 1949, abandoned.

Our Patent 2,574,543, granted November 13, 1951, on an application filed concurrently with said application Serial No. 129,710, describes the breaking of petroleum emulsions by means of certain resins oxyalkylated with both ethylene oxide and propylene oxide in stated relative proportions. The new products of the present application are a small group of the compositions described in our said patent, which compositions have outstanding properties, presumably because of the specific proportions of the three constituents, the resin, the ethylene oxide, and the propylene oxide, from which they are prepared.

Our Patent, 2,560,333, granted July 10, 1951, describes certain hydrophile synthetic products which are the oxyalkylation products of alpha, beta-alkylene oxides having not more than four carbon atoms and oxyalkylation-susceptible, fusible, organic solvent-soluble, water-insoluble, phenolic resins, which resins are derived at least in part from acetylenic hydrocarbons. The resins described as reactants for the production of the demulsifiers of our said patent are those used in producing the particular small class of oxyalkylated products of the present application.

In the products of the present invention, the selected phenolic resin derived at least in part from acetylenic hydrocarbons so as to introduce an altered acetylenic radical as the linking structure between phenolic nuclei is oxyalkylated with both ethylene oxide and propylene oxide, in such weight proportions of the three reactants as to come approximately within the area defined by points 1, 2, 3, 4 on the accompanying chart, which is a conventional representation of a 3-component system, proportions being weight proportions of the three components. The line 3—4 represents a propylene oxide: ethylene oxide ratio of 55.5:44.5; the line 4—1 about 4% resin; the point 1 about 57.5% propylene oxide and the point 2 40% propylene oxide; and the line 2—3 represents 50% resin.

Products, as above described briefly, and hereinafter described in detail, are particularly effective in breaking petroleum emulsions of the water-in-oil type. Oil field emulsions of this type are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

The new products herein described are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents, as, for example, for cosmetics, spray oils, water-repellent textile finishes, as lubricants, etc.

A variety of resins obtained from phenol and acetylene or its polymers, or from phenols, aldehydes having 1 to 8 carbon atoms and acetylene or its polymers, useful as intermediates for producing the products of the present invention are known. We refer to our Patent 2,560,333, the application for which was copending with our said application Serial No. 129,710, for a detailed description of such resins, and to Examples 1 through 24 thereof for specific examples of phenol-acetylene resins, to Examples 1a through 68a for examples of suitable phenol-$C_1$-$C_8$ aldehyde resins for after treatment with acetylene to produce intermediates for use in producing the products of the invention and to Examples 1b through 10b for examples of phenol-aldehyde resins subjected to after treatment with acetylene to produce suitable intermediates, and to Examples 1c through 5c for examples of suitable intermediates prepared by the after treatment of phenol-acetylene resins with aldehydes.

Particularly important intermediates are those illustrated in the first half of column 9 of said patent, namely, those derived from acetylene and difunctional phenols having a hydrocarbon substituent containing at least 4 and not more than 12 carbon atoms.

With reference to such resins, it is obvious that one might use a mechanical mixture of two different resins, or one might employ mixtures of phenolic reactants or acetylenic reactants to produce a resin useful as an intermediate for producing the products of the present invention.

The oxyalkylation of resins of the kind from which the products used in the practice of the present invention are prepared is advantageously catalyzed by the presence of an alkali. Useful alkaline catalysts include soaps, sodium acetate, sodium hydroxide, sodium methylate, caustic potash, etc. The amount of alkaline catalyst usually is between 0.2% to 2%. The temperature employed may vary from room temperature to as high as 200° C. The reaction may be conducted with or without pressure, i. e., from zero pressure to approximately 200 or even 300 pounds gauge pressure (pounds per square inch). In a general way, the method employed is substantially the same procedure as used for oxyalkylation of other organic materials having reactive phenolic groups.

It may be necessary to allow for the acidity of a resin in determining the amount of alkaline catalyst to be added in oxyalkylation. For instance, if a non volatile strong acid such as sulfuric acid is used to catalyze the resinification reaction, presumably after being converted into a sulfonic acid, it may be necessary and is usually advantageous to add an amount of alkali equal stoichiometrically to such acidity, and include added alkali over and above this amount as the alkaline catalyst.

It is advantageous to conduct the oxyethylation or oxypropylation in the presence of an inert solvent such as xylene, cymene, decalin, ethylene glycol diethylether, diethyleneglycol diethylether, or the like, although with many resins, the oxyalkylation proceeds satisfactorily without a solvent. Since xylene is cheap and may be permitted to be present in the final product used as a demulsifier, it is our preference to use xylene. This is particularly true in the manufacture of products from low-stage resins, i. e., of 3 and up to and including 7 units per molecule.

If a xylene solution is used in an autoclave as hereinafter indicated, the pressure readings of course represent total pressure, that is, the combined pressure due to xylene and also due to ethylene or propylene oxide. Under such circumstances it may be necessary at times to use substantial pressures to obtain effective results, for instance, pressures up to 300 pounds along with correspondingly high temperatures, if required.

However, even in the instance of high-melting resins, a solvent such as xylene can be eliminated in either one of two ways. After the introduction of approximately 2 or 3 moles of ethylene oxide, for example, per phenolic nucleus, there is a definite drop in the hardness and melting point of the resin. At this stage, if xylene or a similar solvent has been added, it can be eliminated by distillation (vacuum distillation if desired) and the subsequent intermediate, being comparatively soft and solvent-free, can be reacted further in the usual manner with ethylene oxide or some other suitable reactant.

Another procedure is to continue the reaction to completion with such solvent present and then eliminate the solvent by distillation in the customary manner.

Attention is directed to the fact that the resins herein described must be fusible or soluble in an organic solvent. Fusible resins invariably are soluble in one or more organic solvents, such as those mentioned elsewhere herein. It is to be emphasized, however, that the organic solvent employed to indicate or assure that the resin meets this requirement need not be the one used in oxyalkylation. Indeed solvents which are susceptible to oxyalkylation are included in this group of organic solvents. Examples of such solvents are alcohols and alcohol-ethers. However, where a resin is soluble in an organic solvent, there are usually available other organic solvents which are not susceptible to oxyalkylation, useful for the oxyalkylation step. In any event, the organic solvent-soluble resin can be finely powdered, for instance, to 100 to 200 mesh, and a slurry or suspension prepared in xylene or the like, and subjected to oxyalkylation. The fact that the resin is soluble in an organic solvent, or the fact that it is fusible, means that it consists of separate molecules. Phenolic resins of the type herein specified possess reactive hydroxyl groups and are oxyalkylation susceptible.

In our application Serial No. 8,730, filed February 16, 1948, now abandoned, in regard to phenol-aldehyde resins per se, we said as follows:

"Based on molecular weight determinations, most of the resins prepared as herein described, particularly in the absence of a secondary heating step, contain 3 to 6 or 7 phenolic nuclei with approximately 4½ or 5½ nuclei as an average. More drastic conditions of resinification yield resins of greater chain length. Such more intensive resinification is a conventional procedure and may be employed, if desired. Molecular weight, of course, is measured by any suitable procedure, particularly by cryoscopic methods; but using the same reactants and using more drastic conditions of resinification one usually finds that higher molecular weights are indicated by higher melting points of the resins and a tendency to decreased solubility. See what has been said elsewhere herein in regard to a secondary step involving the heating of a resin with or without the use of vacuum."

If such resins are given an after-treatment with acetylene, and such treatment, in order to meet the requisites herein stated, joins at least two resin molecules together by a linkage such as the following:

then, of course, there is an increase in molecular weight of at least double the previous value. Similarly, resins prepared in the manner of the commercial product, "Koresin," (the trademark employed to describe certain resins manufactured by General Aniline and Film Corporation) such as an amyl, hexyl, or octyl "Koresin," yield relatively soft or tacky resins, in which there are only 3 or 4 or possibly 5 units. Such resins can be treated further with formaldehyde in the manner described, so as to give resins of higher molecular weights than the initial resin. Therefore without attempting to elaborate too closely, we simply desire to point out that the range of molecular weight of the various resins herein contemplated may go anywhere from a low range resin having 3 to 6 or 7 phenolic nuclei with approximately 4 to 5 nuclei as an average, up to ratios double these values or in excess thereof. In other words, a phenol-aldehyde resin may be subjected to treatment with acetylene, or inversely, a phenol-acetylene resin may be treated with an aldehyde. The most practical procedure is simply to take any mixture of phenols and treat it with acetylene or the equivalent, to obtain a fusible, organic solvent-soluble resin; or, if desired, prepare a phenol-aldehyde resin and treat such resin with acetylene.

As far as the preparation of the phenol-aldehyde resins go for subsequent after-treatment with acetylene, attention is called to the following paragraph which appears in our aforementioned abandoned application Serial No. 8,730:

"We have pointed out that either an alkaline or acid catalyst is advantageously used in preparing the resin. A combination of catalysts is sometimes used in two stages; for instance, an alkaline catalyst is sometimes employed in a first stage, followed by neutralization and addition of a small amount of acid catalyst in a second stage. It is generally believed that even in the presence of an alkaline catalyst, the number of moles of aldehyde, such as formaldehyde, must be greater than the moles of phenol employed, in order to introduce methylol groups in the intermediate stage. There is no indication that such groups appear in the final resin, if prepared by the use of an acid catalyst. It is possible that such groups may appear in the finished resins prepared solely with an alkaline catalyst; but we have never been able to confirm this fact in an examination of a large number of resins prepared by ourselves. Our preference, however, is to use an acid-catalyzed resin, particularly employing a formaldehyde-to-phenol ratio of 0.95 to 1.20, and, as far as we have been able to determine, such resins are free from methylol groups. As a matter of fact, it is probable that in acid-catalyzed resinifications, the methylol structure may appear only momentarily at the very beginning of the reaction, and in all probability, is converted at once into a more complex structure during the intermediate stage."

One procedure which can be employed in the use of a new resin to prepare products of the invention is to determine the hydroxyl value by the Verley-Bölsing method or its equivalent. The resin as such, or in the form of a solution, as described, was then treated with a mixture of ethylene oxide and propylene oxide in presence of 0.5% to 2% of sodium methylate as a catalyst in step-wise fashion. The ratios of propylene oxide and ethylene oxide employed correspond to the ratios in the limiting points on the triangular graph in the accompanying drawing, to wit, 1, 2, 3, 4. Our preference is to use the propylene oxide and then the ethylene oxide, although useful products are obtained by using ethylene oxide and then propylene oxide or by carrying out the oxyalkylation with the use of the two oxides at the same time.

Attention is directed to the fact that in the subsequent examples reference is made to the step-wise addition of the alkylene oxide, such as ethylene oxide. It is understood, of course, there is no objection to the continuous addition of alkylene oxide until the desired stage of reaction is reached. In fact, there may be less of a hazard involved and it is often advantageous to add the alkylene oxide, or mixture, slowly in a continuous stream and in such amount as to avoid exceeding the higher pressures noted in the various examples or elsewhere.

It may be well to emphasize the fact that some resins are comparatively soft or pitch-like at ordinary temperatures. Such resins become comparatively fluid at 110° to 165° C., as a rule, and thus can be readily oxyalkylated, without the use of a solvent.

Ordinarily, the oxyalkylation is carried out in autoclaves provided with agitators or stirring devices. We have found that the speed of the agitation markedly influences the time reaction. In some cases, the change from slow speed agitation, for example, in a laboratory autoclave, with a stirrer operating at a speed of 60 to 200 R. P. M., to high speed agitation with the stirrer operating at 250 to 350 R. P. M., reduces the time required for oxyalkylation by one-half to two-thirds. Frequently xylene-soluble products which give insoluble products by procedures employing comparatively slow speed agitation, give suitable hydrophile products when produced by similar procedure, but with high speed agitation, as a result, we believe, of the reduction in the time required, with consequent elimination or curtailment of opportunity for curing or etherization. Even if the formation of an insoluble product is not involved, it is frequently advantageous to speed up the reaction, thereby reducing production time, by increasing agitating speed. In large scale operations, we have demonstrated that economical manufacturing results from continuous oxyalkylation, i. e., an operation in which the alkylene oxide is continuously fed to the reaction vessel, with high speed agitation, i. e., an agitator operating at 250 to 350 R. P. M. Continuous oxyalkylation, other conditions being the same, is more rapid than batch oxyalkylation, but the latter is ordinarily more convenient for laboratory operation.

In the continuous addition of ethylene oxide we have employed either a cylinder of ethylene oxide without added nitrogen, provided that the pressure of the ethylene oxide was sufficiently great to pass into the autoclave, or we have used an arrangement, which, in essence, was the equivalent of an ethylene oxide cylinder with a means for injecting nitrogen so as to force the ethylene oxide in the manner of an ordinary seltzer bottle, combined with the means for either weighting the cylinder or measuring the ethylene oxide used volumetrically. In the case of propylene oxide we invariably used nitrogen pressure to cause the oxide to move into the autoclave. Such procedure and arrangement for injecting liquids is, of course, conventional. In adding ethylene oxide or propylene oxide continuously, there is one precaution which must be taken at all times. The addition of the oxide must stop immediately if there is any indication that reaction is stopped, or, obviously, if reaction is not started at the beginning of the reaction period. Since the addition of ethylene oxide is invariably an exothermic reaction, whether or not reaction has taken place, can be judged in the usual manner by observing (a) Temperature rise or drop, if any; and
(b) Amount of cooling water or other means required to dissipate heat of reaction;

thus, if there is a temperature drop without the use of cooling water or equivalent, or if there is no rise in temperature without using cooling water control, careful investigation should be made.

The resins employed are prepared in the manner described in various examples of our said Patent 2,560,333. Instead of being prepared on a laboratory scale, they were prepared in 10- to 15-gallon electro-vapor-heated synthetic resin pilot plant reactors, as manufactured by the Blaw-Knox Company, Pittsburgh, Pennsylvania, and completely described in their Bulletin No. 2087, issued in 1947, with specific reference to Specification No. 71–3965.

In preparing the derivatives we have used the following procedure throughout. Prepare the resins with a certain amount of solvent, such as xylene, present purely as a convenience. We have treated the resins with propylene oxide and ethylene oxide in three different ways:

(a) Add the ethylene oxide first and then the propylene oxide;
(b) Add the propylene oxide first and then the ethylene oxide; and
(c) Use a mixture of propylene oxide and ethylene oxide, and make a single addition.

In each case we have used an alkaline catalyst equivalent to approximately one-half per cent to 1% of the total reaction mass in the final stage, or equivalent to one-fourth per cent of alkaline catalyst based on final compound.

A number of resins were employed from a group of seven resins obtained by the action of acetylene on the following seven phenols:

1. Para-secondary butylphenol
2. Para-tertiary amylphenol
3. Para-phenylphenol
4. Para-octylphenol
5. Mixed para- and ortho propylphenol
6. Cardanol
7. Side-chain hydrogenated cardanol The relative proportions of the materials are those indicated by the point circled and of the point 2 on the conventional triangular chart or graph of the attached figure. In this chart each vertex represents 100% of the material indicated, i. e., a phenolic resin, ethylene oxide, or propylene oxide. Points in the area represent composition indicated in the usual manner.

Our exploration of products containing various proportions of the three constituents revealed that the most effective compositions from the standpoint of demulsification and, we believe, for other purposes, were found within three relatively restricted areas, of which one is the area 1, 2, 3, 4, the products represented by which are the subject matter of this invention while the products represented by the other two are the subject matter of other applications filed concurrently herewith.

We prepared a series of five different phenol-acetylene resins by treating with acetylene the first five phenols in the list above, i. e., para-secondary butylphenol, para-tertiary amylphenol, para-phenylphenol, para-octylphenol, and mixed para- and ortho-propylphenol, and oxyalkylated them in one series in the proportions of 10 grams of resin to 100 grams of ethylene oxide to 140 grams of propylene oxide, using 250 grams of xylene as a solvent and 1 gram of flake caustic soda as catalyst and in another series in the proportions of 50 grams of resin to 10 grams of ethylene oxide to 40 grams of propylene oxide, with 100 grams of xylene as a solvent and 0.5 gram of flake caustic soda as catalyst. The oxyalkylation of each of the resins was carried out in three different ways:

(a) Adding all the ethylene oxide first and then the propylene oxide;
(b) Adding the propylene oxide first and then the ethylene oxide;
(c) Mixing the two oxides and adding them simultaneously.

We have prepared also a number of similar derivatives in which the previously mentioned seven resins prepared from a selected phenol and acetylene were given an after-treatment with an aldehyde so as to produce a more complex resin in which there was present more than one type of linking unit, i. e., one derived from acetylene and one derived from an aldehyde. The same applies to some resins which were prepared in a reverse manner, in which the phenol-aldehyde resin was subjected to after-treatment with acetylene.

Resins derived exclusively from phenols and formaldehyde, react the same way in the ethylene oxide-propylene oxide treatment as do resins derived exclusively from comparable phenols and acetylene. It follows obviously that such resins in which the mixed groupings appear, i. e., both acetylene groupings and aldehyde groupings, must fall within the same limiting characteristics and this mixed type resin does act substantially the same and is susceptible to the same treatment as far as oxyalkylation goes, with the same results as the phenol-acetylene resins.

We again desire to point out that the amount of alkaline catalyst used is not critical. This is true whether the catalyst be caustic soda, caustic potash, sodium methylate, or any other suitable catalyst. The amount which we regularly employed has varied from 1%, based on the resin alone, to 1% based on the resin and oxides, although in many cases, the reaction has been speeded up by using approximately twice this amount of caustic. We are inclined to believe that whenever the amount of caustic represents more than 2% of the reactants present, ignoring inert solvent, that there may be some tendency, to form cyclic polymers with the alkylene oxide, although this is purely a matter of speculation. For this reason, whether justified or not, we have usually avoided use of excess amounts of catalyst.

As we have stated, products of unusual value are produced when their compositions are such that the three components are in proportions represented by the area 1, 2, 3, 4 on the appended drawing. We have prepared a number of derivatives which come within this area and such derivatives are most effective demulsifiers, and effective for other purposes. It is understood, of course, in each instance the composition is based on the assumption that the percentage by weight basis is on a statistical basis, which it obviously must be, and assumes completeness of reaction.

In preparing a further series of products falling within the area 1, 2, 3, 4 of the drawing, we have used a xylene solution obtained by dissolving the resin. The final product, in all instances, was adjusted to 50% xylene and 50% resin. This was purely a matter of convenience. In this particular series, and in fact, any other series where large amounts of a phenol resin were employed, we have used commercially available para-tertiary butylphenol acetylene resin. The amounts of other resins available were limited, and thus, part of the experiments were conducted on a laboratory scale.

The resins employed in the first series of compounds which are identified as Examples XAA1, XBB1 and XFF1, were obtained from amylphenol acetylene resins, and which, for all practical purposes, are nothing more than the amylphenol homologues of the commercially available butyl acetylene resin. The amount of resin employed, the amount of ethylene oxide employed, and the amount of propylene oxide employed, are given in grams in the following three examples. The weight of caustic soda employed is indicated in grams. In all these examples all propylene oxide was added first and then all ethylene oxide.

| Ex. No. | Resin, Grams | Ethylene Oxide, Grams | Propylene Oxide, Grams | Flake Caustic, Grams |
|---|---|---|---|---|
| XAA1 | 62.4 | 32.5 | 42.0 | .75 |
| XBB1 | 45.7 | 35.0 | 75.0 | .75 |
| XFF1 | 28.4 | 43.2 | 75.0 | .75 |

A second set of three examples designated as Examples XAA2, XBB2 and XFF2, were prepared in the same manner, using the same ratios except that the resin employed was that made from para-secondary butylphenol. This resin was again substantially the analogue of commercially available butylphenol acetylene resin except that the commercial product was obtained from a para-tertiary butylphenol, and this resin was obtained from a para-secondary butylphenol. All the subsequent resins were the same analogues of commercial butylphenol acetylene resins, except that the other phenols were employed as previously noted, and as herein specified.

For example, in the third series of three compounds the same ratios were used and indentified as Examples XAA3, XBB3 and XFF3. The resin employed was prepared from acetylene and para-phenylphenol.

A fourth series of three examples was prepared, using the same ratios and identified as Example XAA4, XBB4 and XFF4, and prepared from para-octylphenol.

Similarly, a fifth series was prepared from the resin obtained by reaction between mixed para- and ortho-propylphenol and acetylene, designated as XAA5, XBB5 and XFF5.

Likewise, a sixth series was prepared from the only presently commercially available phenol—the resin obtained from para-tertiary butylphenol and acetylene—"Koresin" as sold in the open market. This last series was indicated as XAA6, XBB6 and XFF6.

In all these series the same ratios of reactants as indicated in Examples XAA1, XBB1 and XFF1 were used. The procedure was the same as has been described previously in regard to oxyethylation and oxypropylation. In each instance the propylene oxide was added first and then the ethylene oxide.

In a second series of compounds the same ratios were preserved in every respect, except that the ethylene oxide was added first and then the propylene oxide. These series are indicated by the designations YAA1, YBB1 and YFF1, for the amylphenols, and the corresponding designation for the others.

A third series was prepared using the same ratios except that ethylene oxide and propylene oxide were mixed together and added simultaneously, so that oxyalkylation was a random or indifferent oxyalkylation, in the sense that no control was employed to determine which oxide combined first with the resin. This third series is indicated by the prefix "Z" instead of X and Y.

Examination of results in demulsification tests shows that the X series was best, the Y series very good, and the Z series good.

In the final comparison all the resins were on an equal dilution basis, 50% of the oxyalkylated derivatives and 50% xylene.

Having thus described our invention, what we claim as new and desire to secure by Letters Patent is:

1. Hydrophile synthetic products; said hydrophile synthetic products being oxyalkylation products which are the reaction products of (a) both ethylene oxide and alpha-beta propylene oxide; and (b) an oxyalkylation-susceptible, fusible, organic solvent-soluble, water-insoluble, phenolic resin in which at least a part of the radicals linking the phenolic nuclei are divalent radicals resulting from the reaction of an acetylenic hydrocarbon with a phenolic structure; said resin being derived, at least in part, by reaction of a phenol with an acetylenic hydrocarbon so as to introduce an altered acetylenic radical as the linking structure between phenolic nuclei with any remaining linkages between phenolic nuclei being divalent radicals resulting from phenol-aldehyde condensation and having not more than 8 carbon atoms; said oxyalkylated resin being characterized by the introduction into the resin molecule of a plurality of divalent $C_2H_4O$ and $C_3H_6O$ radicals, with the proviso that the composition of said hydrophile synethetic products, based on a statistical average and assuming completeness of reaction, and calculated back to the three oxyalkylation step reactants, i. e., resin, ethylene oxide and propylene oxide, on a percentage weight basis must fall approximately within the area defined by the points 1, 2, 3, 4 of the chart in the accompanying drawing.

2. Hydrophile synthetic products; said hydrophile synthetic products being oxyalkylation products which are the reaction products of (a) both ethylene oxide and alpha-beta propylene oxide; and (b) an oxyalkylation-susceptible, fusible, organic solvent-soluble, water-insoluble, phenolic resin in which the radicals linking the phenolic nuclei are divalent radicals resulting from the reaction of acetylene with a phenol; said resin being derived by reaction of a phenol with acetylene so as to introduce an altered acetylenic radical as the linking structure between phenolic nuclei; said oxyalkylated resin being characterized by the introduction into the resin molecule of a plurality of divalent $C_2H_4O$ and $C_3H_6O$ radicals, with the proviso that the composition of said hydrophile synthetic products, based on a statistical average and assuming completeness of reaction, and calculated back to the three oxyalkylation step reactants, i. e., resin, ethylene oxide and propylene oxide, on a percentage weight basis must fall approximately within the area defined by the points 1, 2, 3, 4 of the chart in the accompanying drawing.

3. The product of claim 1, wherein the resin is derived from para-tertiary butylphenol.

4. The product of claim 1, wherein the resin is derived from para-tertiary amylphenol.

5. The product of claim 1, wherein the resin is derived from para-octylphenol.

References Cited in the file of this patent

UNITED STATES PATENTS

| | | |
|---|---|---|
| 2,040,212 | Orthner et al. | May 12, 1936 |
| 2,076,624 | De Groote | Apr. 13, 1937 |
| 2,574,543 | De Groote et al. | Nov. 13, 1951 |
| 2,629,705 | De Groote et al. | Feb. 24, 1953 |

FOREIGN PATENTS

| | | |
|---|---|---|
| 447,417 | Great Britain | May 18, 1936 |

OTHER REFERENCES

Ellis: The Chemistry of Synthetic Resins, volume II, pages 1559 to 1566, Reinhold Publishing Corporation, 1936, New York.

Zoss et al.: Industrial and Engineering Chemistry, volume 41, January 1949, pages 73 to 77.